(12) United States Patent
Winterowd et al.

(10) Patent No.: US 7,279,226 B2
(45) Date of Patent: Oct. 9, 2007

(54) COMPOSITION AND METHOD FOR INHIBITING STAIN FORMATION IN A FLOOR COVERING

(75) Inventors: Jack G. Winterowd, Puyallup, WA (US); Jerry D. Izan, Tacoma, WA (US); Charles E. Lewis, Federal Way, WA (US); Tri Tran, Tacoma, WA (US); Daniel V. Hanson, Auburn, WA (US)

(73) Assignee: Weyerhaeuser Company, Federal Way, WA (US)

( * ) Notice: Subject to any disclaimer, the term of this patent is extended or adjusted under 35 U.S.C. 154(b) by 471 days.

(21) Appl. No.: 10/606,549

(22) Filed: Jun. 25, 2003

(65) Prior Publication Data

US 2004/0265613 A1    Dec. 30, 2004

(51) Int. Cl.
*B32B 5/16*    (2006.01)

(52) U.S. Cl. .................. 428/511; 428/512; 428/514; 428/537.1; 428/537.5; 427/316; 427/317; 427/325; 427/326; 427/395; 427/396; 427/397; 427/408; 427/411; 427/419.5; 427/419.8; 106/286.7; 524/428

(58) Field of Classification Search .............. 428/511, 428/512, 514, 537.1, 537.5; 427/316, 317, 427/325, 326, 395, 396, 397, 408, 411, 419.5, 427/419.8; 106/286.7; 524/428
See application file for complete search history.

(56) References Cited

U.S. PATENT DOCUMENTS 5,993,534 A * 11/1999 Winterowd et al. ......... 106/461
6,489,037 B1 * 12/2002 Winterowd et al. ......... 428/511

* cited by examiner

*Primary Examiner*—Leszek Kiliman
(74) *Attorney, Agent, or Firm*—Christensen O'Connor Johnson Kindness

(57) ABSTRACT

A composition and method for inhibiting stain formation in a floor covering. The composition includes a copper glycine complex in combination with magnesium hydroxide and a carrier. The composition can be advantageously applied to a wood-based substrate upon which a floor covering is overlaid. Flooring assemblies that include the composition are also provided.

22 Claims, 1 Drawing Sheet

COMPOSITION AND METHOD FOR INHIBITING STAIN FORMATION IN A FLOOR COVERING

FIELD OF THE INVENTION

This invention relates to compositions and methods for inhibiting stain formation in a floor covering.

BACKGROUND OF THE INVENTION

Decorative vinyl floor coverings are commonly installed in residential dwellings in North America. Manufacturers of vinyl floor coverings include Armstrong World Industries (Lancaster, Pa.), Mannington (Salem, N.J.), Congoleum Corporation (Mercerville, N.J.), and Tarkett Incorporated (Whitehall, Pa.). Contemporary floor covering materials are described in U.S. Pat. No. 5,308,694. Although there are a number of elaborate vinyl floor covering construction designs, most are comprised of a three-layered structure. The bottom layer generally consists of a plasticized polymeric film, felt, or paper. The middle layer is the decorative portion and often consists of polyvinyl chloride along with plasticizing agents, dyes and/or pigments, stabilizers, and/or other components. In many cases this decorative layer has a cellular structure, which is achieved by decomposing a blowing agent, most commonly azodicarbonamide, during the manufacturing process. In some cases a colored design is gravure-printed on the topside of the middle layer. A discontinuous pattern of foam inhibitor can also be deposited on the topside of the middle layer in order to yield a highly textured floor covering. The upper layer is known as the "wear layer" and often consists of a plasticized polyvinyl chloride or polyurethane film.

Most types of vinyl floor covering are thin and very conformable. Thus, they must be installed directly over a smooth, flat substrate. Residential subfloors consisting of ¾ inch oriented strand board or plywood subfloor panels mounted over 2 inch×10 inch joists are frequently abused during the home building process, and have surfaces that are often too rough and irregular to be used as a vinyl floor covering substrate. It is common practice to install a thin, smooth panel, known as an "underlayment panel", over the rough subfloor just prior to installation of the vinyl floor covering. Typical underlayment panels are sanded and comprised of plywood, particleboard, oriented strandboard, or cement/fiber board. Plywood underlayments that are commonly used in North America include those derived from lauan veneer and manufactured in Indonesia and Malaysia. A plywood underlayment, known as MULTIPLY, is composed of aspen veneer and is manufactured by Columbia Forest Products (Greensboro, N.C.). Another plywood underlayment, known as TECHPLY, is composed of Russian birch veneer and is distributed in North America by the Plywood & Doors Mfrs. Corporation (Union, N.J.). A ⅜ inch thick cement/fiber board, known as FIBERBOND, is sold as underlayment by the Louisiana-Pacific Corporation (Portland, Oreg.).

Most underlayment panels for vinyl floor covering are comprised of wood laminates or composites. Wood is known to contain an array of extractives. Some of these extractives are soluble in the plasticizers used in vinyl flooring. Unfortunately, the plasticizers in vinyl flooring are known to migrate into the wooden underlayment and can dissolve otherwise immobile colored compounds. Under conditions of elevated temperatures, the dissolved colored compounds can rapidly diffuse into the vinyl floor covering, where they can be visible as a stain. Homeowners cannot remove this type of stain. Resolution generally requires replacement of the vinyl floor covering.

It is common for decorative, felt-backed, vinyl flooring to be installed directly over wooden subfloors in a so-called factory-built home. Adhesives are not typically used to secure the vinyl to the subfloor. Instead, the vinyl is simply stapled along the perimeter of the floor and walls are then installed directly over these attachment points. Transition molding can be used at carpet/vinyl interfaces.

There are a number of methods that can be used to inhibit the vinyl stain formation process. One method is to utilize a wooden subfloor that is composed of wood that has a minimal content of colored compounds that are soluble in vinyl plasticizer. For instance, Weyerhaeuser oriented strandboard (OSB) production facilities that serve this market avoid the use of wood species such as elm, which is now known to contain 7-hydroxycadalenal, which is an intensely yellow, plasticizer-soluble compound. Unfortunately, virtually all wood contains some level of colored extractives and it is not commercially feasible to remove these extractives for the manufactured housing market. A second method is to discontinue the use of plasticizer in the decorative vinyl flooring. This is known to virtually eliminate the staining potential of the vinyl. Unfortunately, the plasticizer is required in order to produce the vinyl flooring and in order to impart flexibility and toughness to it. Alternatively, an additional layer, which resists the migration of plasticizer, can be incorporated into the vinyl flooring. Such products are commercially available and are known to be more resistant to bottom-up stain formation. Unfortunately, these same products are more expensive.

Another set of solutions to this problem is based on the utilization of a third material in the floor system that can be positioned between the wood subfloor and the vinyl flooring. Appropriate materials will have very low plasticizer permeance. Examples of such materials include sheet goods such as aluminum foil and nylon film. These sheet goods can be very effective at inhibiting stain formation. Unfortunately, they are relatively expensive and inconvenient. Another class of material that can be installed between the wood and the vinyl to inhibit stain formation are liquid coatings, such as KILZ or BULLSEYE SHELLAC. This class also includes Portland cement-based coatings, as well as coating formulations based on magnesium hydroxide or a copper morpholine complex. Liquid coatings have the advantage of being relatively low in cost and they are easily applied to discrete portions of the subfloor that will be overlaid with vinyl flooring. However, liquid coatings have the disadvantage of requiring a drying period subsequent to application and prior to vinyl flooring installation.

Therefore, a need exists for a liquid composition that effectively inhibits bottom-up stain formation in overlaid vinyl flooring that does not require a drying period subsequent to application and prior to vinyl flooring installation. The present invention seeks to fulfill this need and provides further related advantages.

SUMMARY OF THE INVENTION

In one aspect, the present invention provides a composition that inhibits stain formation in a floor covering. The composition includes a copper glycine complex, magnesium hydroxide, and a carrier. The composition of the invention can be applied to any wood-based substrate to inhibit stain formation in an overlaid floor covering. The composition can be applied to the substrate and does not require a drying period prior to floor covering installation.

In another aspect, a method for inhibiting stain formation in floor coverings is provided that utilizes the compositions of the invention.

In a further aspect of the invention, a stain resistant flooring assembly is provided. The assembly includes a floor covering, a wood-based substrate, and a coating of anti-stain composition intermediate the wood based substrate and the floor covering. The anti-stain composition includes a copper glycine complex, magnesium hydroxide, and a carrier.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
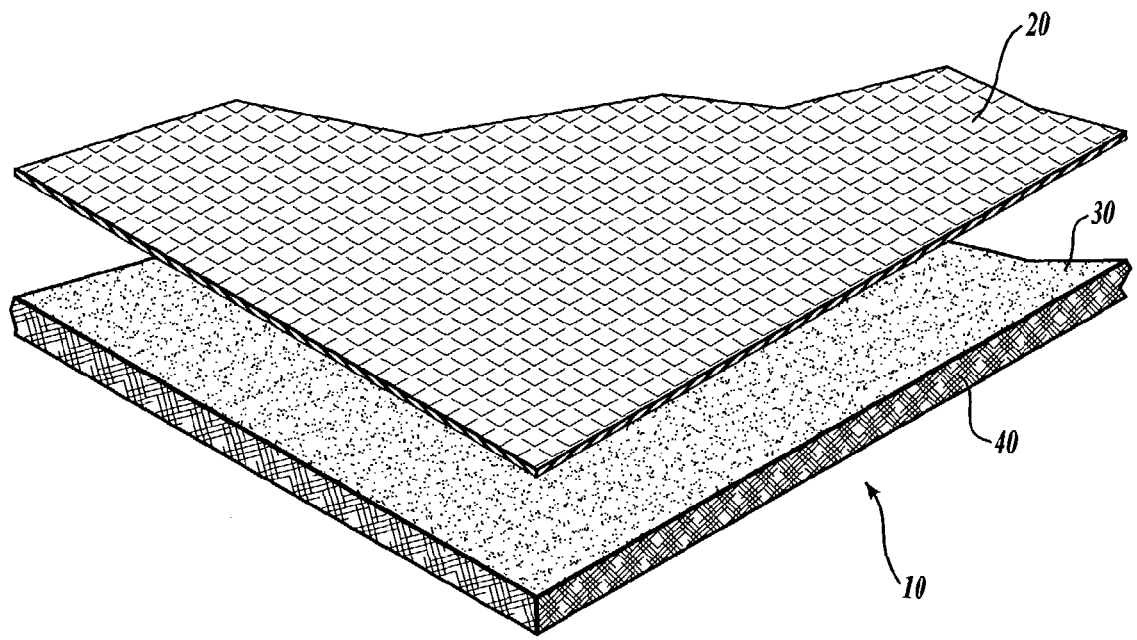
FIG. 1 is a perspective view of a representative flooring assembly including a wood-based substrate with a coated surface formed in accordance with the present invention and an overlaid floor covering.

In one aspect, the present invention provides a composition for inhibiting stain formation in a floor covering. The composition includes a copper glycine complex, magnesium hydroxide, and a carrier. The composition can be applied to those parts of a wood-based substrate that are to be overlaid with a floor covering. After application of the composition of the invention, the overlaid floor covering is thereafter substantially resistant to bottom-up stain formation, even when the floor is exposed to an environment of elevated temperature and high relative humidity. The composition of the invention requires no drying time subsequent to application and prior to floor covering installation. Subsequent to application, the composition does not absorb into the polyvinyl chloride-based plastisol layers of the floor covering and does not dimensionally distort the flooring. Further, the composition does not solidify or dry out, thereby providing the option of repositioning the floor covering after initial installation.

The composition of the invention for inhibiting stain formation includes a copper glycine complex, magnesium hydroxide, and a carrier. The amount of the copper glycine complex in the composition is present in an amount sufficient to provide the desired level of stain prevention. Typical levels of the copper glycine complex in the composition range from about 5 to about 20 percent by weight based on the total weight of the composition. Magnesium hydroxide is present in the composition in an amount from about 1 to about 15 percent by weight based on the total weight of the composition. The carrier is present in the composition in an amount from about 20 to about 80 percent by weight based on the total weight of the composition.

The copper glycine complex is generally formed in situ as the composition is prepared. To form the complex, it is most convenient to sequentially charge a blending vessel with water and a water-soluble copper salt. Appropriate copper salts useful in the practice of the invention include, for example, copper (II) chloride and copper (II) nitrate, among others. After the copper has been solubilized, glycine is added to the formulation and the mixture is subjected to a high shear mixing in order to form the copper glycine complex dispersed in water. The copper glycine complex typically has a copper to glycine molar ratio in the range of from about 1:1 to about 1:4. A copper to glycine molar ratio of about 1:2 is preferred. In some embodiments, additives such as dispersing agents are added. The magnesium hydroxide is then added to the mixture and the mixture is subjected to further high shear mixing. A suitable source of magnesium hydroxide is obtained in a powder form, known as MAGCHEM MH10 from Martin Marietta Magnesia Specialties (Baltimore, Md.). The final formulation is prepared by dispersing the active ingredients into a solution that includes a carrier. The dispersed particles have a size of about 10 um or less, and preferably about 5 um or less.

A suitable carrier for use in the composition can be any liquid that is substantially insoluble in polyvinyl chloride (PVC)-based plastisols and has a very low vapor pressure at ambient conditions. The term "substantially insoluble" refers to solubility of the carrier of less than about 1% in PVC-based plastisols. Examples of compounds useful as carriers in the composition of the invention include aromatic polyether based polyols, such as derivatives of bisphenol A.

Other additives that can be incorporated into the composition include any agent that improves the shelf-life or rheology of the composition for the intended application to a wood-based substrate. Examples of useful additives include opacifying agents, viscosifying agents, diluents, polymers, surfactants, dispersants, fillers, preservatives, and pigments.

In some embodiments of the invention, it is advantageous to incorporate an opacifying agent in the composition in order to lighten the blue color of the copper glycine complex. Opacifying agents may be either inorganic or organic compounds. Examples of useful inorganic opacifiers include, for example, titanium dioxide, zinc oxide, talc, mica or coated mica (with oxides of titanium, tin, or iron or bismuth oxychloride), magnesium aluminum silicate, bismuth oxychloride, or other minerals. Opacifying agents can be present in the composition in an amount from about 0 to about 20%, or from about 10 to about 20% of the composition based on the total weight of the composition. In one embodiment, the opacifying agent is titanium dioxide.

In some embodiments of the invention, viscosifying agents are included in the composition. The viscosity of the composition can be adjusted to a level that is most convenient for the intended application. Examples of suitable viscosifying agents include fumed silica, polysaccharide-based, or associative thickeners. Associative thickeners are low molecular weight synthetic polymers or modified cellulosics. Such viscosifying agents may be included from about 1 to about 10%, and preferably from about 1 to about 2% by weight based on the total weight of the composition. In some embodiments, the composition includes polymers. Useful polymers include latex such as a carboxylated styrene-butadiene latex.

The preparation of a representative composition of the invention is described in Example 1.

In another aspect, the invention provides methods for inhibiting stain formation in a floor covering overlaying a wood-based substrate. The methods include applying a coating of the stain inhibiting composition of the invention, as described above, to a surface of a wood-based substrate and then overlaying a floor covering onto the coated surface of the wood-based substrate. The floor covering can be laid over the coated substrate immediately after applying the coating, without waiting for the coating to dry.

Wood-based products useful in the practice of the invention include, for example, oriented strand panels, plywood panels, and wooden underlayment panels. Wooden underlayment panels that are suitable for this invention include those composed of oriented strandboard, particleboard, medium density fiberboard, plywood, or any other wooden panel or board material that is utilized in a flooring system and is positioned just beneath decorative vinyl floor covering. Panels or boards that are only partially composed of wood can also be used in this invention. The dimensions of the underlayment panel or board are not critical to this invention, but thickness values between ⅛ inch and 1¼ inch will most generally be utilized.

In the method of the invention, the composition can be applied to the wooden substrate by use of a spray gun, a roll-coating machine including direct roll coating and reverse roll filling machines, a curtain-coater, a slot-coater, or any other liquid application equipment. It is advantageous to adjust the viscosity of each coating composition to a level that is convenient for the specified application equipment and technique. For instance, relatively high viscosity values are helpful when the composition is being applied to a substrate by use of a roll-coating machine. In contrast, relatively low viscosity values are desired when a composition is being applied by use of a spray gun or a curtain-coating machine. When a composition is being applied with a curtain-coating machine, the surface tension properties are particularly important. Surface tension values are generally manipulated by use of surfactants. In one embodiment, the coating composition is applied to a wood-based substrate, such as oriented strandboard, by use of spray or roll-coating techniques at an application rate of about 12 to 20 $g/ft^2$.

In the method of the invention, the floor covering can be overlaid onto the coated wood based substrate immediately, with no drying requirement prior to installation. This is a key advantage in the assembly of manufactured homes in which houses are produced in mass in a factory. An additional advantage of the method of the invention is the ability to reposition the floor covering subsequent to initial installation.

The floor covering useful in the method of the invention can be any composite material that includes a transparent or translucent wear (upper) layer, a decorative layer such as a printed patterned layer and one or more backing (lower) layers. Typically, the wear layer of a resilient vinyl floor covering consists of a plasticised PVC composition. The printed patterned layer may, for example, be a printed acrylic or PVC film. The backing layer adjacent, such as a printed patterned layer, commonly contains one or more white or other coloured pigments to enhance the appearance of the printed patterned layer as seen through the wear layer. The backing layer may consist of a plasticized polymeric film, felt, or paper. In some embodiments of the method of the invention, the floor covering is perimeter attached. In one embodiment of the method of the invention, felt-backed vinyl flooring is immediately placed on top of the applied composition and attached along the perimeter, allowing the composition to absorb into the felt-backing without distorting the dimensions of the vinyl flooring.

The stain blocking efficacy of a representative composition of the invention is compared to compositions that include magnesium hydroxide and carrier, and carrier only, in Example 4. The stain blocking efficacy of a representative composition of the invention with Armorbright and Legacy vinyl floor coverings is described in Examples 5 and 6, respectively.

In another aspect, the present invention provides a floor assembly resistant to stain formation, comprising a wood-based substrate having a surface coated with a composition for inhibiting stain formation in a floor covering, and a floor covering overlaying the composition. The composition includes a copper glycine complex, magnesium hydroxide, and carrier.

Figure 2:
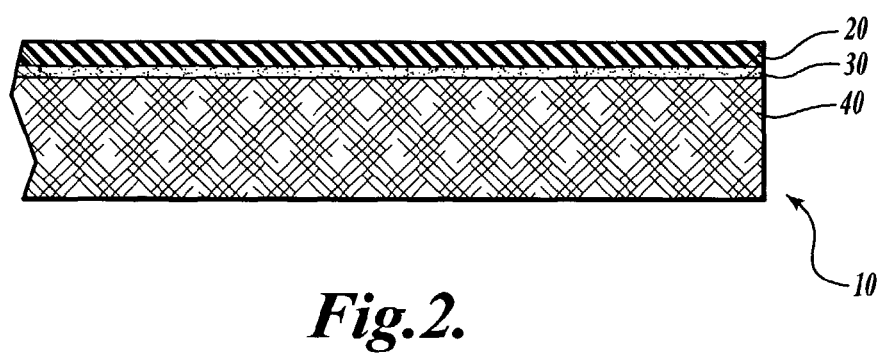
FIG. 2 is a cross-sectional view of the representative flooring assembly depicted in FIG. 1.

FIG. 1 shows one embodiment of a flooring assembly 10 of the present invention. Assembly 10 includes floor covering 20 overlaid on wood-based substrate 40 (e.g., OSB) having a surface 30 coated with a composition for inhibiting stain formation 30. FIG. 2 shows a cross-sectional view of a flooring assembly 10, which shows the floor covering 20 overlaid upon a coated surface 30 of a wood-based substrate 40. The coated surface 30 is intermediate the wood-based substrate 40 and the floor covering 20, and the coating is applied to a major surface of the wood-based substrate. The coating includes a copper glycine complex, magnesium hydroxide, and a carrier, as described above.

In one embodiment, the flooring assembly of the invention can be assembled by fastening the perimeter of floor covering 20 over the wood-based substrate 40 by any useful means such as, for example, staples, adhesives, nails, screws, and the like. In some embodiments, the perimeter of the wood-based substrate is left uncoated and the floor covering is attached along the perimeter of the floor and the walls are then installed directly over these attachment points. In some embodiments, the flooring assembly of the invention can be installed into a factory built home.

The following examples are provided for the purpose of illustrating, not limiting, the invention.

EXAMPLES

Example 1

Preparation of a Representative Stain Inhibiting

Composition: Copper Glycine and Magnesium Hydroxide

In this example, the preparation of a representative stain inhibiting composition of the invention containing copper glycine and magnesium hydroxide is described.

A mixing vessel equipped with a high shear Cowles disperser was charged with water (11.53 parts by weight) and copper (II) nitrate trihydrate (11.53 parts by weight). The mixture was agitated until the copper nitrate completely dissolved. Glycine powder (7.69 parts by weight) was then added to the vessel and the components were subjected to high shear mixing for a period of 20 minutes. The copper/glycine complex thus formed was at least partially insoluble and the particle size of the precipitate was about 5 um. A nonionic, acetylenic diol in isopropyl alcohol, known as Surfynol 104PA [Air Products & Chemicals Incorporated, Allentown, Pa.] (0.08 parts by weight) was then added to the vessel and the components were stirred for an additional 5 minutes. Titanium dioxide, known as Tronox CR-826 [Kerr-McGee Chemical Corporation, Oklahoma City, Okla.] (3.84 parts by weight), was then added to the vessel and the components were subjected to high shear mixing for a period of about 20 minutes. An aromatic polyether polyol, known as SynFac 8009 [Milliken Chemical, Spartenburg, S.C.] (46.12 parts by weight), was then added to the vessel and the components were subjected to high shear mixing for a period of about 20 minutes. Magnesium hydroxide powder, known as MagChem MH10 [Martin Marietta Magnesia Specialties Incorporated, Baltimore, Md.] (19.22 parts by weight), was then added to the vessel and the components were subjected to high shear mixing for a period of about 20 minutes. The resulting material containing dispersed particles up to about 5 um in size was known as "blue paste". It was generally stable and resistant to phase separation and settling during storage.

A final formulation was prepared by charging a second mixing vessel with SynFac 8009 (9.38 parts by weight) and water (3.13 parts by weight). The components were agitated under low shear until a clear solution was obtained. A carboxylated styrene-butadiene latex, known as CPS-812 [Dow Reichhold Specialty Latex, LLC, Research Triangle Park, N.C.] (15.63 parts by weight) was then added to the vessel and the components were gently agitated for a 30 minute period. No coagulation was observed at this point. More SynFac 8009 (21.88 parts by weight) was added to the mixing vessel and the components were gently agitated for an additional 30 minutes. The "blue paste" (50.00 parts by weight) was added to the mixing vessel and the components were gently agitated for an additional 30 minutes. This final mixture yielded a +7 reading on a Hegman drawdown gage and had a viscosity of 5180 cps [Brookfield, #3 spindle, 20 rpm, 20° C.]. This formulation exhibited minimal phase separation and no sediment formation after 1 month of storage at a temperature of 20° C.

Example 2

First Comparative Composition: Magnesium Hydroxide

In this example, the preparation of a comparative composition containing magnesium hydroxide and no copper glycine is described.

A mixing vessel equipped with a high shear Cowles disperser was charged with water (14.27 parts by weight) and Surfynol 104PA (0.001 parts by weight) and the components were stirred for 5 minutes. Titanium dioxide, known as Tronox CR-826 (4.76 parts by weight), was then added to the vessel and the components were subjected to high shear mixing for a period of about 20 minutes. An aromatic polyether polyol, known as SynFac 8009 (57.09 parts by weight), was then added to the vessel and the components were subjected to high shear mixing for a period of about 20 minutes. Magnesium hydroxide powder, known as MagChem MH10 (23.79 parts by weight), was then added to the vessel and the components were subjected to high shear mixing for a period of about 20 minutes. The resulting material containing dispersed particles up to about 5 um in size was known as "white paste". It was generally stable and resistant to phase separation and settling during storage.

A final formulation was prepared by charging a second mixing vessel with SynFac 8009 (9.38 parts by weight) and water (3.13 parts by weight). The components were agitated under low shear until a clear solution was obtained. A carboxylated styrene-butadiene latex, known as CPS-812 (15.63 parts by weight) was then added to the vessel and the components were gently agitated for a 30 minute period. No coagulation was observed at this point. More SynFac 8009 (21.88 parts by weight) was added to the mixing vessel and the components were gently agitated for an additional 30 minutes. The "white paste" (50.00 parts by weight) was added to the mixing vessel and the components were gently agitated for an additional 30 minutes.

Example 3

Second Comparative Composition: Matrix Only

In this example, the preparation of a comparative composition composed of the carrier components of Examples 1 and 2 (i.e., the composition does not contain magnesium hydroxide or copper glycine) is described.

A formulation was prepared by charging a mixing vessel with SynFac 8009 (18.75 parts by weight) and water (6.25 parts by weight). The components were agitated under low shear until a clear solution was obtained. A carboxylated styrene-butadiene latex, known as CPS-812 (31.25 parts by weight) was then added to the vessel and the components were gently agitated for a 30 minute period. No coagulation was observed at this point. More SynFac 8009 (43.75 parts by weight) was added to the mixing vessel and the components were gently agitated for an additional 30 minutes.

Example 4

Stain Blocking Efficacy Comparison

The stain blocking efficacy of the compositions prepared as described in Examples 1-3 was comparatively evaluated.

Multiple sections of OSB (6"×12"×23/32") were cut from full-size OSB flooring panels (4'×8'×23/32"), which were manufactured by Weyerhaeuser Company [Federal Way, Wash.].

Vinyl floor covering sections (6"×12") were cut from a large sheet of felt-backed vinyl floor covering known as Diamondfloor [Congoleum Corporation, Mercerville, N.J.].

Ten sections of the vinyl flooring covering were attached to the surface of ten sections of uncoated OSB by use of staples.

A similar set of ten samples was prepared in which the coating formulation that contained both copper/glycine and magnesium hydroxide (Example 1) was applied to one major surface of the OSB sections at a spread rate of 20 g/ft$^2$. These coated sections of OSB were then immediately over-laid with sections of the vinyl flooring, which were then attached to the OSB with staples.

Yet another similar set of ten samples was prepared in which the coating formulation that contained only magnesium hydroxide (Example 2) was applied to one major surface of the OSB sections at a spread rate of 20 g/ft$^2$. These coated sections of OSB were then immediately over-laid with sections of the vinyl flooring, which were then attached to the OSB with staples.

A final similar set of ten samples was prepared in which the coating formulation that contained neither copper/glycine nor magnesium hydroxide (Example 3) was applied to one major surface of the OSB sections at a spread rate of 20 g/ft$^2$. These coated sections of OSB were then immediately over-laid with sections of the vinyl flooring, which were then attached to the OSB with staples.

These 40 laminate samples were placed in an environmental chamber at a temperature of 50° C. and a relative humidity of 90% for a period of 8 weeks. At weekly intervals each sample was withdrawn from the chamber and the attached vinyl flooring was inspected for stain formation. A proprietary image analysis tool was used to objectively identify the size and intensity of the yellow stains that developed on some of the vinyl floor covering samples during the course of the test. The results are shown in Table 1.

TABLE 1

Stain blocking efficacy comparison.

| TIME (WEEKS) | Copper Glycine + Magnesium Hydroxide (Example 1) | | Magnesium Hydroxide only (Example 2) | | Matrix only (Example 3) | | No Coating | |
|---|---|---|---|---|---|---|---|---|
| | Total yellow area (mm²) | Average stain intensity* (saturation) | Total yellow area (mm²) | Average stain intensity* (saturation) | Total yellow area (mm²) | Average stain intensity* (saturation) | Total yellow area (mm²) | Average stain intensity* (saturation) |
| 0 | 0 | 0 | 0 | 0 | 0 | 0 | 0 | 0 |
| 1 | 0 | 0 | 0 | 0 | 0 | 0 | 0 | 0 |
| 2 | 0 | 0 | 0 | 0 | 0 | 0 | 0 | 0 |
| 3 | 0 | 0 | 0 | 0 | 0 | 0 | 0 | 0 |
| 4 | 0 | 0 | 0 | 0 | 0 | 0 | 0 | 0 |
| 5 | 0 | 0 | 0 | 0 | 0 | 0 | 22 | 0.29 |
| 6 | 0 | 0 | 28 | 0.28 | 7.6 | 0.28 | 137 | 0.31 |
| 8 | 0 | 0 | 323 | 0.29 | 193.5 | 0.29 | 328 | 0.32 |

*Saturation values have a range of 0.00-1.00. Over a limited range there is a linear relationship between the saturation value and the concentration of a particular yellow compound in the vinyl flooring.

Example 5

In this example, the stain blocking efficacy of a representative composition of the invention with a commercial vinyl floor covering (Armorbright) is described.

The stain-blocking efficacy of the formulation described in Example 1 that contains both copper/glycine and magnesium hydroxide was evaluated in conjunction with the following materials.

Multiple sections of OSB (6"×12"×23/32") were cut from full-size OSB flooring panels (4'×8'×23/32"), which were manufactured by Weyerhaeuser Company [Federal Way, Wash.].

Vinyl floor covering sections (6"×12") were cut from a large sheet of felt-backed vinyl floor covering known as Armorbright [Congoleum Corporation, Mercerville, N.J.].

Ten sections of the vinyl flooring covering were attached to the surface of ten sections of uncoated OSB by use of staples.

A similar set of ten samples was prepared in which the coating formulation that contained both copper/glycine and magnesium hydroxide was applied to one major surface of the OSB sections at a spread rate of 20 g/ft². These coated sections of OSB were then immediately over-laid with sections of the vinyl flooring, which were then attached to the OSB with staples.

These 20 laminate samples were placed in an environmental chamber at a temperature of 50° C. and a relative humidity of 90% for a period of 8 weeks. At weekly intervals (with the exception of week 7) each sample was withdrawn from the chamber and the attached vinyl flooring was inspected for stain formation. A proprietary image analysis tool was used to objectively identify the size and intensity of the yellow stains that developed on the vinyl floor covering samples during the course of the test. The results are shown in Table 2.

TABLE 2

Formation of yellow stains in Armorbright vinyl floor covering.

| TIME (WEEKS) | Copper Glycine + Magnesium Hydroxide Coating (Example 1) | | No Coating | |
|---|---|---|---|---|
| | Total yellow area (mm²) | Average stain intensity* (saturation) | Total yellow area (mm²) | Average stain intensity* (saturation) |
| 0 | 0 | 0 | 0 | 0 |
| 1 | 0 | 0 | 0 | 0 |
| 2 | 0 | 0 | 0 | 0 |
| 3 | 0 | 0 | 106 | 0.32 |
| 4 | 0 | 0 | 418 | 0.34 |
| 5 | 0 | 0 | 526 | 0.35 |
| 6 | 0 | 0 | 931 | 0.36 |
| 8 | 0 | 0 | 1750 | 0.36 |

*Saturation values have a range of 0.00-1.00. Over a limited range there is a linear relationship between the saturation value and the concentration of a particular yellow compound in the vinyl flooring.

Example 6

In this example, the stain blocking efficacy of a representative composition of the invention with a commercial vinyl floor covering (Legacy) is described.

The stain-blocking efficacy of the formulation described in Example 1 that contains both copper/glycine and magnesium hydroxide was evaluated in conjunction with the following materials.

Multiple sections of OSB (6"×12"×23/32") were cut from full-size OSB flooring panels (4'×8'×23/32"), which were manufactured by Weyerhaeuser Company [Federal Way, Wash.].

Vinyl floor covering sections (6"×12") were cut from a large sheet of felt-backed vinyl floor covering known as Legacy [Congoleum Corporation, Mercerville, N.J.].

Ten sections of the vinyl flooring covering were attached to the surface of ten sections of uncoated OSB by use of staples.

A similar set of ten samples was prepared in which the coating formulation that contained both copper/glycine and magnesium hydroxide was applied to one major surface of the OSB sections at a spread rate of 20 g/ft². These coated sections of OSB were than immediately over-laid with sections of the vinyl flooring, which were then attached to the OSB with staples.

These 20 laminate samples were placed in an environmental chamber at a temperature of 50° C. and a relative humidity of 90% for a period of 8 weeks. At weekly intervals (with the exception of week 7) each sample was withdrawn from the chamber and the attached vinyl flooring was inspected for stain formation. A proprietary image analysis tool was used to objectively identify the size and intensity of the yellow stains that developed on the vinyl floor covering samples during the course of the test. The results are shown in Table 3.

TABLE 3

Formation of yellow stains in Legacy vinyl floor covering.

| | Copper Glycine + Magnesium Hydroxide Coating (Example 1) | | No Coating | |
|---|---|---|---|---|
| TIME (WEEKS) | Total yellow area (mm²) | Average stain intensity* (saturation) | Total yellow area (mm²) | Average stain intensity* (saturation) |
| 0 | 0 | 0 | 0 | 0 |
| 1 | 0 | 0 | 0 | 0 |
| 2 | 0 | 0 | 35 | 0.39 |
| 3 | 0 | 0 | 316 | 0.38 |
| 4 | 0 | 0 | 527 | 0.41 |
| 5 | 0 | 0 | 661 | 0.43 |
| 6 | 0 | 0 | 749 | 0.44 |
| 8 | 0 | 0 | 913 | 0.46 |

*Saturation values have a range of 0.00-1.00. Over a limited range there is a linear relationship between the saturation value and the concentration of a particular yellow compound in the vinyl flooring.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A composition for inhibiting stain formation in a floor covering, comprising:
   a copper glycine complex present in an amount from about 5 to about 20 percent by weight based on the total weight of the composition;
   magnesium hydroxide; and
   a carrier;
   wherein a drying period is not required after application of the composition to a wood-based substrate, prior to installation of the floor covering.

2. The composition of claim 1, wherein magnesium hydroxide is present in an amount from about 1 to about 15 percent by weight based on the total weight of the composition.

3. The composition of claim 1, wherein the copper glycine complex has a copper to glycine molar ratio in the range of from about 1:1 to about 1:4.

4. The composition of claim 1, wherein the carrier is substantially insoluble in polyvinyichioride-based plastisols.

5. The composition of claim 1, wherein the carrier comprises an aromatic polyether-based polyol.

6. The composition of claim 1, wherein the carrier is present in an amount from about 20 to 80 percent by weight of the total composition.

7. The composition of claim 1 further comprising an additive, wherein the additive is at least one of an opacifying agent, a viscosifying agent, a diluent, a polymer, a surfactant, a dispersant, a filler, a preservative, or a colored pigment.

8. The composition of claim 7, wherein the opacifying agent comprises titanium dioxide.

9. The composition of claim 7, wherein the viscosifying agent is at least one of fumed silica or an associative thickener.

10. The composition of claim 7, wherein the surfactant comprises a nonionic surfactant.

11. The composition of claim 7, wherein the polymer comprises a carboxylated styrene-butadiene latex.

12. The composition of claim 1, wherein the composition includes dispersed particles up to about 5 um in size.

13. A method for inhibiting stain composition in a floor covering overlaying a wood-based substrate, comprising:
   a) applying a stain inhibiting composition to a surface of a wood-based substrate to provide a coated wood-based substrate, wherein the composition comprises a copper glycine complex present in an amount from about 5 to about 20 percent by weight based on the total weight of the composition, magnesium hydroxide, and a carrier, wherein a drying period is not required after application of the composition to the wood-based substrate, prior to installation of the floor covering; and
   b) overlaying the floor covering onto the coated wood-based substrate.

14. The method of claim 13, wherein the floor covering comprises a vinyl floor covering.

15. The method of claim 13, wherein the wood-based substrate comprises oriented strandboard.

16. The method of claim 13, wherein the composition is applied by spraying.

17. The method of claim 13, wherein the composition is applied by roll coating.

18. The method of claim 13, wherein the floor covering is overlaid onto the wood-based substrate immediately after coating the stain inhibiting composition onto the substrate.

19. A flooring assembly resistant to stain formation, comprising:
   a floor covering; and
   a wood-based substrate having a surface coated with a composition for inhibiting stain formation in the floor covering, the composition intermediate the wood based substrate and the floor covering, wherein the composition comprises:
   a copper glycine complex present in an amount from about 5 to about 20 percent by weight based on the total weight of the composition;
   magnesium hydroxide; and
   a carrier;
   wherein a drying period is not required after application of the composition to the wood-based substrate, prior to installation of the floor covering.

20. The flooring assembly of claim 19, wherein the wood-based substrate comprises oriented strandboard.

21. The flooring assembly of claim 19, wherein the floor covering is a vinyl floor covering.

22. The flooring assembly of claim 19, wherein the flooring assembly is installed in a manufactured home.

* * * * *